United States Patent
Ohto et al.

(10) Patent No.: US 6,831,379 B2
(45) Date of Patent: Dec. 14, 2004

(54) PERMANENT MAGNET SYNCHRONOUS LINEAR MOTOR

(75) Inventors: Motomichi Ohto, Kitakyushu (JP);
Masahiko Tanabe, Kitakyushu (JP);
Yasuhiro Miyamoto, Kitakyushu (JP);
Hirofumi Inokuchi, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 10/257,936

(22) PCT Filed: Feb. 26, 2001

(86) PCT No.: PCT/JP01/01146

§ 371 (c)(1),
(2), (4) Date: Oct. 21, 2002

(87) PCT Pub. No.: WO01/80408

PCT Pub. Date: Oct. 25, 2001

(65) Prior Publication Data

US 2003/0098620 A1 May 29, 2003

(30) Foreign Application Priority Data

Apr. 19, 2000 (JP) ........................................ 2000-118022

(51) Int. Cl.[7] .............................................. H02K 41/01
(52) U.S. Cl. ............................. 310/12; 310/13; 310/14
(58) Field of Search ............................... 310/12, 13, 14

(56) References Cited

U.S. PATENT DOCUMENTS

| | | | | |
|---|---|---|---|---|
| 4,912,746 A | * | 3/1990 | Oishi | 310/12 |
| 5,910,691 A | * | 6/1999 | Wavre | 310/12 |
| 6,720,680 B1 | * | 4/2004 | Tanaka | 310/12 |

FOREIGN PATENT DOCUMENTS

| | | | | |
|---|---|---|---|---|
| JP | 61124258 A | * | 6/1986 | ......... H02K/41/025 |
| JP | 4-281359 | | 10/1992 | .......... H02K/41/03 |
| JP | 7-53427 | | 12/1995 | .......... H02K/41/03 |
| JP | 9-37540 | | 2/1997 | .......... H02K/41/03 |
| JP | 11-262236 | | 9/1999 | .......... H02K/41/03 |
| JP | 2000184684 A | * | 6/2000 | .......... H02K/41/02 |
| JP | 3127259 | | 11/2000 | .......... H02K/41/03 |
| JP | 2001-8432 | | 1/2001 | .......... H02K/41/03 |

* cited by examiner

*Primary Examiner*—Tran Nguyen
*Assistant Examiner*—J. Aguirrechea
(74) *Attorney, Agent, or Firm*—Westerman, Hattori, Daniels & Adrian, LLP

(57) ABSTRACT

A permanent magnet synchronous linear motor comprising a field yoke (1) having a plurality of permanent magnets (2) the polarity of which is alternated and which are arranged linearly and an armature (3) facing the array of the permanent magnets (2) through a magnetic air gap, wherein the armature (3) comprises an armature core (4) having main teeth (4b) and slots (4a), an armature winding (5) wound in the slots 4a of the armature core (4), and auxiliary teeth (6) provided at both the ends of the armature core (4). The distance $\tau_p$ between the centers of the auxiliary teeth (6) and the pitch $\tau_m$ of the field poles satisfy a relation $\tau_p = (2n-1) \times \tau_m/2$ (n is a positive integer) and the length O of the auxiliary teeth (6) is in a relation of O<Hd<Ht where Hd is the length of the auxiliary teeth (6) in the direction orthogonal to the array of permanent magnets and Ht is the length of the main teeth (4b) in the direction orthogonal to the array of permanent magnets. Thus a high performance permanent magnet synchronous linear motor having reduced cogging thrust can be provided.

10 Claims, 5 Drawing Sheets

1 Field yoke
2 Permanent magnet
3 Armature
4 Armature core
4a slot
4b Main-teeth
4c Yoke portion
5 Armature winding
6 Auxiliary teeth 1 Field yoke 2 Permanent magnet 3 Armature 4 Armature core 4a slot

4b Main-teeth

4c Yoke portion

5 Armature winding

6 Auxiliary teeth

Fig. 1

Hd: Length of the auxiliary teeth

Ht: Length of the main teeth $\tau_p$: Center-to-center distance of the auxiliary teeth in this embodiment $\tau_{po}$: Center-to-center distance of the auxiliary teeth in the conventional technique

PERMANENT MAGNET SYNCHRONOUS LINEAR MOTOR

TECHNICAL FIELD

This invention relates to a permanent magnet synchronous linear motor that has a reduced cogging thrust and that is superior in performance.

BACKGROUND ART

Conventionally, there is known a permanent magnet synchronous linear motor that is used for a feed mechanism of a machine tool or for a positioning device of a semiconductor manufacturing apparatus and that includes permanent magnets constituting a field pole and an armature facing the pole face of the permanent magnets through an air gap and in which an armature winding is wound in a slot of an armature core.

A cogging thrust is generated due to an edge effect at both ends of the armature core when the armature is moved in the longitudinal direction of the magnet array of the permanent magnets due to an electromagnetic effect with the permanent magnets in a state where an electric current is not passed through the armature winding of such a structured linear-motor. In order to reduce this cogging thrust, a linear motor that has auxiliary teeth at both ends of the armature core has been proposed as a conventional technique described as follows.

Figure 5:
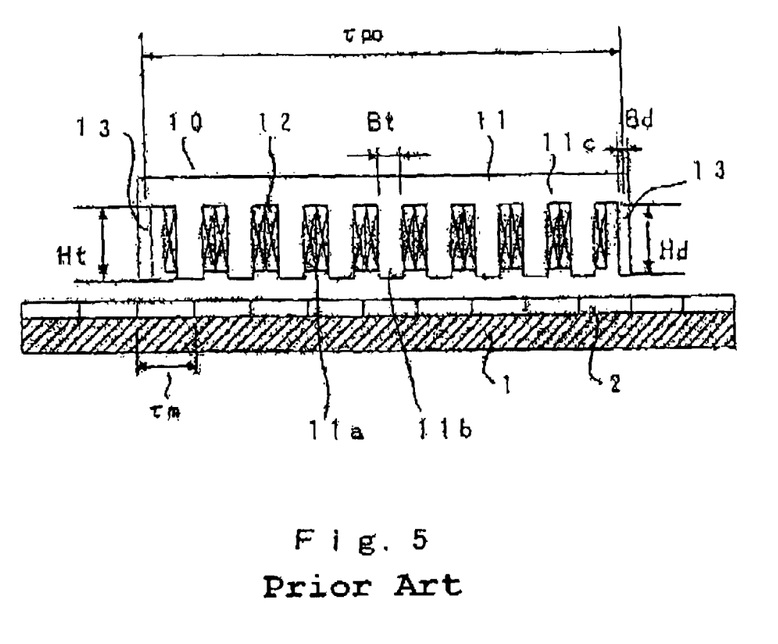
FIG. 5 is a side sectional view of a permanent magnet synchronous linear motor showing a first conventional technique.

FIG. 5 is a side sectional view of a permanent magnet synchronous linear motor that shows a first conventional technique that uses the 8-pole and 9-slot gap-opposed type (see JP,7-053427,Y2 for example).

In FIG. 5, 1 is a flat field yoke, 2 is a plurality of permanent magnets disposed on the field yoke 1 so as to alternate the polarity thereof, 10 is an armature facing the pole face of the permanent magnet 2 through an air gap, and 11 is an armature core in which an electromagnetic steel plate is pectinately cut and in which an armature-core disc that has main teeth 11b forming slots 11a and a yoke portion 11c by which main teeth 11b are connected is placed and fixed thereto. 12 is an armature winding wound and contained in the slot 11a. 13 are auxiliary teeth provided at both ends of the armature core 11, and the length Ht of the main teeth 11b is equal to the length Hd of the auxiliary teeth 13. In this linear motor, the permanent magnets 2 provided on the field yoke 1 serve as a stator, and the armature 10 serves as a movable part and runs in the longitudinal direction of the field yoke 1.

In such a structured linear motor, the distance between the centers of the auxiliary teeth is an odd number of times as large as half of a field-pole pitch, i.e., satisfies the relationship of $\tau_{po}=(2n-1)\times\tau_m/2$ where $\tau_{po}$ is the distance between the centers of the auxiliary teeth disposed at both ends of the armature, and $\tau_m$ is the field-pole pitch. FIG. 5 shows an example in which n=9.

Further, a linear motor disclosed in JP,60-30195,B can be mentioned as a second conventional technique.

In this linear motor, the distance $\tau_{po}$ between the centers of auxiliary teeth provided at both ends of an armature is an odd number of times as large as the field-pole pitch $\tau_m$, and satisfies the relationship of $\tau_{po}=(2n-1)\times\tau_m$.

However, in the conventional techniques, the distance between the centers of the auxiliary teeth is specified as mentioned above as a countermeasure for which an edge effect at the ends of the armature core is removed, but the intention to improve performance in accordance with the usage of the linear motor conversely narrows design freedom, and therefore a cogging thrust cannot be reduced, and, disadvantageously, difficulties in improving the performance of the linear motor cannot be eliminated.

Additionally, the distance between the centers of the auxiliary teeth, which is specified by the conventional techniques, is calculated in consideration of a primary component in which a change occurs in the ratio of 1 cycle to 1 magnetic-pole pitch. Therefore, a great reducing effect is brought about on the primary component, but, if a secondary component or a high-order component is contained in a cogging waveform, a reducing effect on the high-order component is small, and a situation occurs in which cogging cannot be reduced.

Still additionally, there is a situation in which the pitch between the auxiliary teeth where a cogging reducing effect is maximized deviates from the aforementioned pitch specified by the conventional techniques because of, for example, an influence of a slot shape between the teeth of the armature.

The present invention has been made to solve the problems, and it is an object of the present invention to provide a high-performance permanent magnet synchronous linear motor that has a reduced cogging thrust.

DISCLOSURE OF INVENTION

In order to solve the problems, a first aspect of is characterized in that a permanent magnet synchronous linear motor comprises a field yoke having a plurality of permanent magnets which constitute field poles so that the polarity thereof is alternated and which are arranged linearly and an armature facing an array of the permanent magnets through a magnetic air gap, in which the armature comprises an armature core having main teeth and slots, an armature winding wound in the slots of the armature core, and auxiliary teeth provided at both ends of the armature core and in which the center-to-center distance τ of the auxiliary teeth and the pitch $\tau_m$ of the field poles satisfy a relationship $\tau p=(2n-1)\times\tau_m/2$ (n is a positive integer) and in which the field pole and the armature are relatively moved under the condition that one of the field pole and the armature is caused to serve as a stationary element and the other one is caused to serve as a movable element, wherein the length of the auxiliary teeth results in a relationship of 0<Hd<Ht where Hd is the length of the auxiliary teeth in the direction orthogonal to the array of the permanent magnets and Ht is the length of the main teeth in the direction orthogonal to the array of the permanent magnets.

Another aspect of the invention is characterized in that, in the permanent magnet synchronous linear motor according to the first aspect, the width Bd of the auxiliary teeth along the longitudinal direction of the array of the permanent magnets is set to be narrower than the width Bt of the main teeth along the longitudinal direction of the array of the permanent magnets.

Another aspect of the invention is characterized in that, in the permanent magnet synchronous linear motor according to the above aspects, the ratio Hd/Ht of the length Hd of the auxiliary teeth to the length Ht of the main teeth is set to be 0.5<Hd/Ht<1.

Yet another aspect of the invention is characterized in that, in the permanent magnet synchronous linear motor according to any one of the above aspects, the armature core is made up of a plurality of divided cores, and is formed such that a convex engagement part is provided on a side face of a yoke portion that constitutes the divided cores, and a concave engagement part is provided on an opposite side face thereof, and thereafter adjoining parts of the engagement parts are fitted and coupled with each other.

Yet another aspect of the invention is characterized in that a permanent magnet synchronous linear motor comprises a field yoke having a plurality of permanent magnets which constitute field poles so that the polarity thereof is alternated and which are arranged linearly and an armature facing the array of the permanent magnets through a magnetic air gap, in which the armature comprises an armature core having main teeth and slots, an armature winding wound in the slots of the armature core, and auxiliary teeth provided at both ends of the armature core and in which the center-to-center distance $\tau_p$ of the auxiliary teeth and the pitch 1m of the field poles satisfy a relationship $\tau_p \neq (2n-1) \times \tau_m/2$ (n is a positive integer) and in which the field pole and the armature are relatively moved under the condition that one of the field pole and the armature is caused to serve as a stationary element and the other one is caused to serve as a movable element, wherein the length of the auxiliary teeth results in a relationship of $0 < Hd \leq Ht$ where Hd is the length of the auxiliary teeth in the direction orthogonal to the array of the permanent magnets and Ht is the length of the main teeth in the direction orthogonal to the array of the permanent magnets.

Another aspect of the invention is characterized in that, in the permanent magnet synchronous linear motor according to the fifth aspect, the ratio Hd/Ht of the length Hd of the auxiliary teeth to the length Ht of the main teeth is set to be $0.5 \leq Hd/Ht \leq 1$.

Yet another aspect of the invention is characterized in that, in the permanent magnet synchronous linear motor according to one of the prior two aspects, the armature core is made up of a plurality of divided cores, and is formed such that a convex engagement part is provided on a side face of a yoke portion that constitutes the divided cores, and a concave engagement part is provided on an opposite side face thereof, and thereafter adjoining parts of the engagement parts are fitted and coupled with each other.

An eighth aspect of the invention is characterized in that a permanent magnet synchronous linear motor comprises a field yoke having a plurality of permanent magnets which constitute field poles so that the polarity thereof is alternated and which are arranged linearly and an armature facing the array of the permanent magnets through a magnetic air gap, in which the armature comprises an armature core having main teeth and slots, an armature winding wound in the slots of the armature core, and auxiliary teeth provided at both ends of the armature core, and in which the field pole and the armature are relatively moved under the condition that one of the field pole and the armature is caused to serve as a stationary element and the other one is caused to serve as a movable element, wherein the center-to-center distance $\tau_p$ of the auxiliary teeth and the pitch $\tau_m$ of the field poles satisfy a relationship $(2n-1) \tau_m/8 \tau_p \leq (2n-1) \tau_m/2$ (n is a positive integer), and wherein the length of the auxiliary teeth results in a relationship of $0 < Hd \leq Ht$ where Hd is the length of the auxiliary teeth in the direction orthogonal to the array of the permanent magnets and Ht is the length of the main teeth in the direction orthogonal to the array of the permanent magnets.

Another aspect of the invention is characterized in that, in the permanent magnet synchronous linear motor according to the eighth aspect, the width Bd of the auxiliary teeth along the longitudinal direction of the array of the permanent magnets is set to be narrower than the width Bt of the main teeth along the longitudinal direction of the array of the permanent magnets.

Yet another aspect of the invention is characterized in that, in the permanent magnet synchronous linear motor according to the prior aspect, the armature core is made up of a plurality of divided cores, and is formed such that a convex engagement part is provided on a side face of a yoke portion that constitutes the divided cores, and a concave engagement part is provided on an opposite side face thereof, and thereafter adjoining parts of the engagement parts are fitted and coupled with each other.

BEST MODE FOR CARRYING OUT THE INVENTION

Embodiments of the present invention will hereinafter be described with reference to the drawings.

First Embodiment

Figure 1:
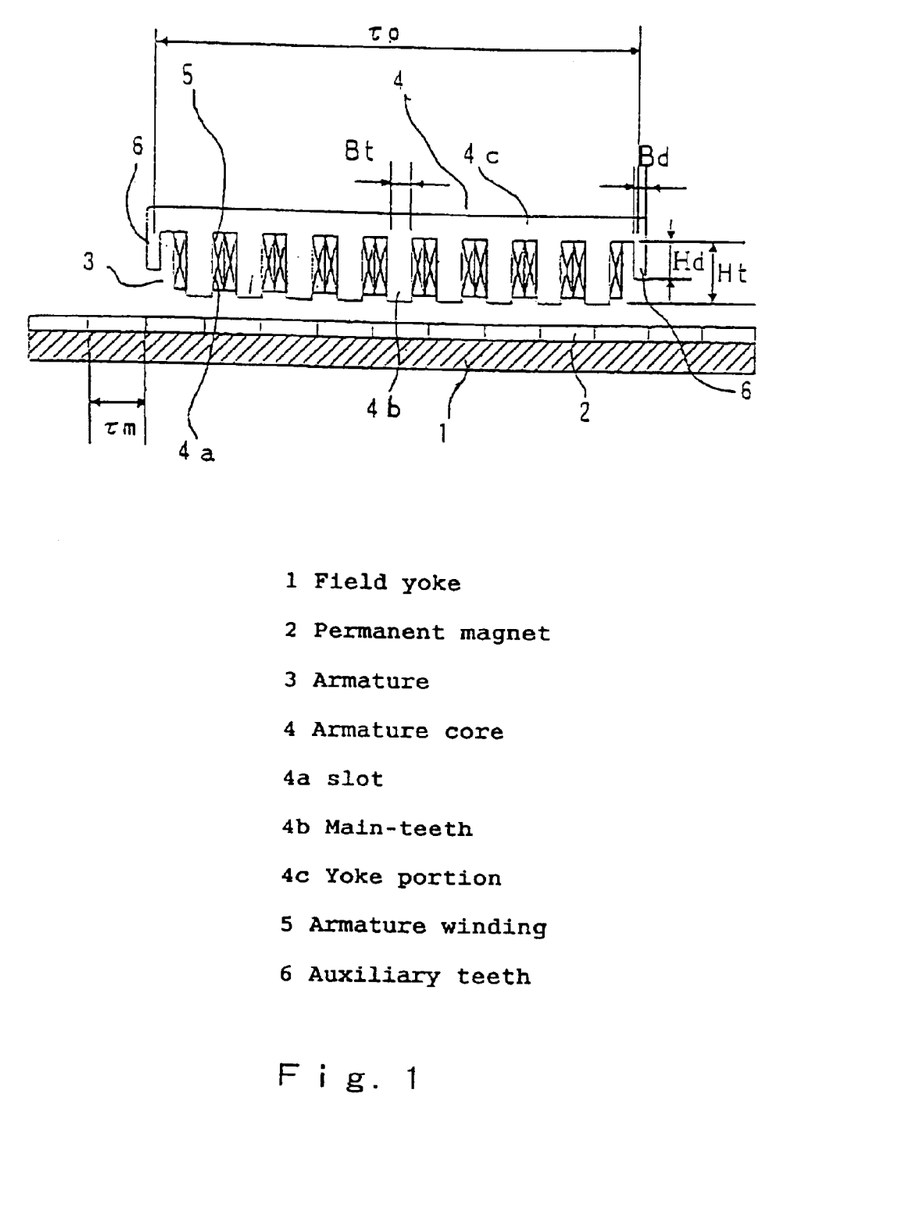
FIG. 1 is a side sectional view of a permanent magnet synchronous linear motor showing the embodiment of the present invention, the linear motor being common in describing the relationship between main teeth and auxiliary teeth in the First through Third Embodiments.

FIG. 1 is a side sectional view of a permanent magnet synchronous linear motor showing the embodiments of the present invention, the linear motor being common in describing the relationship between main teeth and auxiliary teeth in the First through Third Embodiments.

In the present invention, the same reference numbers are given the same constituent elements as in the conventional technique, and a description thereof is omitted. Only different respects will be described. The linear motor is the 8-pole and 9-slot gap-opposed type as in the conventional technique.

In FIG. 1, 3 is an armature, 4 is an armature core, 4a is a slot, 4b are main teeth, 4c is a yoke portion, 5 is an armature winding, and 6 are auxiliary teeth.

In this embodiment, the linear motor has a stationary element structured by permanent magnets 2 serving as field poles and a movable element structured by the armature 3 having the auxiliary teeth 6 at both ends of the armature core 4 that has the slots 4a and the main teeth 4b and in which the armature winding 5 is wound. The linear motor basically has the same structure as that of the conventional technique.

Thereafter, in this embodiment, a cogging thrust was calculated according to a numerical analysis using the finite element method on the supposition that the distance between the centers of the auxiliary teeth 6 is $\tau_p$, the distance between the centers of the auxiliary teeth 6 shown in the conventional technique of FIG. 5 is $\tau_{po}$ and the center-to-center distance $\tau_p$ of the auxiliary teeth 6 and the length Hd of the auxiliary teeth 6 are used as parameters. Herein, the length of the auxiliary teeth 6 in the direction orthogonal to the array of the permanent magnets 2 is represented as Hd, and the length of the main teeth 4b in the direction orthogonal to the array of the permanent magnets 2 is represented as Ht.

Figure 2:
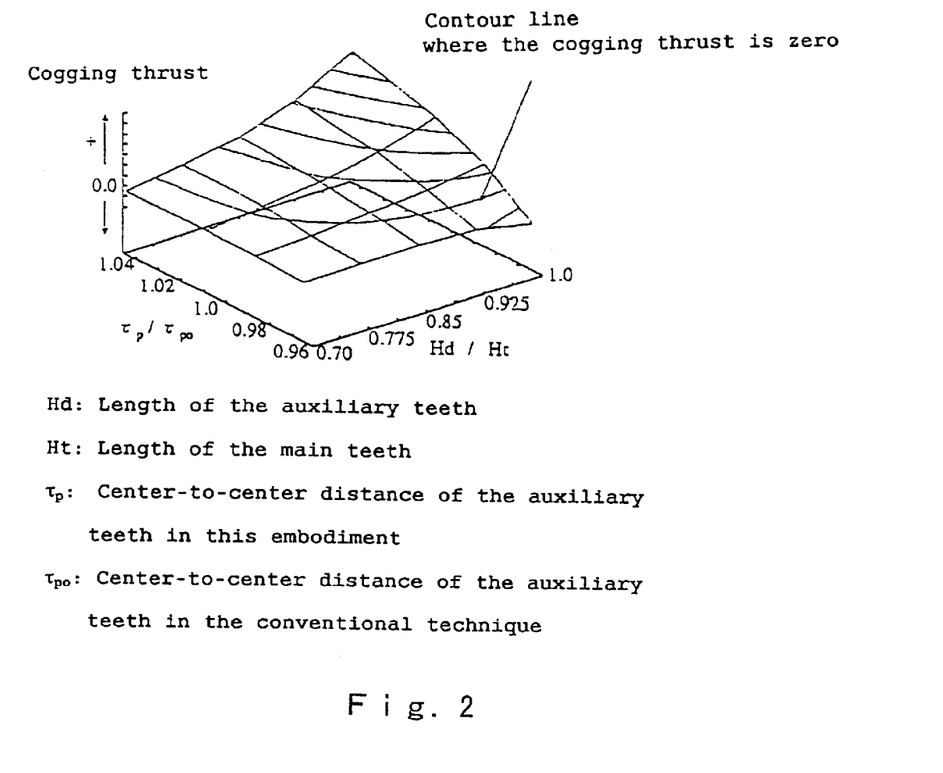
FIG. 2 shows an analytical result obtained by calculating a cogging thrust according to a numerical analysis in which the center-to-center distance $\tau_p$ of the auxiliary teeth and the length of the auxiliary teeth are used as parameters.

FIG. 2 shows an analytical result obtained by calculating a cogging thrust according to a numerical analysis in which the center-to-center distance $\tau_p$ of the auxiliary teeth 6 and the length Hd of the auxiliary teeth 6 are used as parameters.

Figure 4:
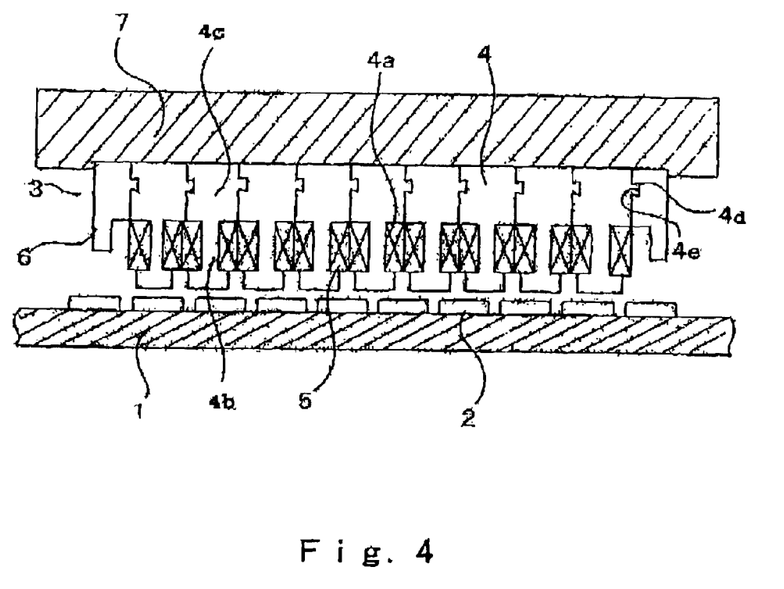
FIG. 4 is a side sectional view of a permanent magnet synchronous linearmotor showing a Fourth Embodiment of the present invention, the linear motor having divided cores.

The vertical axis represents a cogging thrust, and the horizontal axis represents the ratio $\tau_p/\tau_{po}$ of the center-to-center distance $\tau_p$ of the auxiliary teeth 6 shown in FIG. 1 to center-to-center distance $\tau_{po}$ of the auxiliary teeth 6 shown in FIG. 4 and represents the ratio Hd/Ht of the length Hd of the auxiliary teeth 6 to the length Ht of the main teeth 4b. The contour line equal in value to the cogging thrust is shown by connecting each calculation point like a lattice. FIG. 2 is shown by giving positive and negative signs to the cogging thrust, in consideration of the direction of the cogging thrust.

In the example of FIG. 2, a point where the cogging thrust reaches almost zero exists by appropriately setting the length Hd of the auxiliary teeth 6 when the ratio $\tau_p/\tau_{po}$ is within the range of about 0.98 or more, and, when designed, design freedom can be made greater than conventionally.

Although the point exists at which the cogging thrust reaches almost zero in this example, it depends on the pitch of the field poles or on the teeth width or shape of the armature. A change, such as that shown in FIG. 2, can be known by a numerical analysis or an experiment.

Additionally, in this example, a slight cogging thrust has occurred under the condition that the length of the auxiliary teeth 6 is equal to the length of the main teeth 4b, and the distance between the centers of the auxiliary teeth 6 is $\tau_{po}$, which is disclosed in JP,7-053427,Y2. This results from an influence caused by the shape of the front end of the main teeth 4b, and shows that there is a situation where the optimum point deviates from the pitch $\tau_{po}$ specified in JP,7-053427,Y2.

Even in this situation, according to the present invention, the cogging thrust can be reduced to a numerical value of almost zero by appropriately setting the length Hd of the auxiliary teeth 6 to be 0<Hd<Ht under the condition that the relationship between the center-to-center distance $\tau_p$ of the auxiliary teeth 6 and the pitch $\tau_m$ of the field poles is set to be $\tau_p=(2n-1)\times\tau_m/2$ (n is a positive integer).

Next, a description will be given of the operation of the auxiliary teeth 6. The cogging thrust F of the linear motor is expressed by the following equation:

$$F=F1+F2 \qquad (1)$$

where F1 is a thrust acting on the main teeth, and F2 is a thrust acting on the auxiliary teeth 6.

Figure 3:
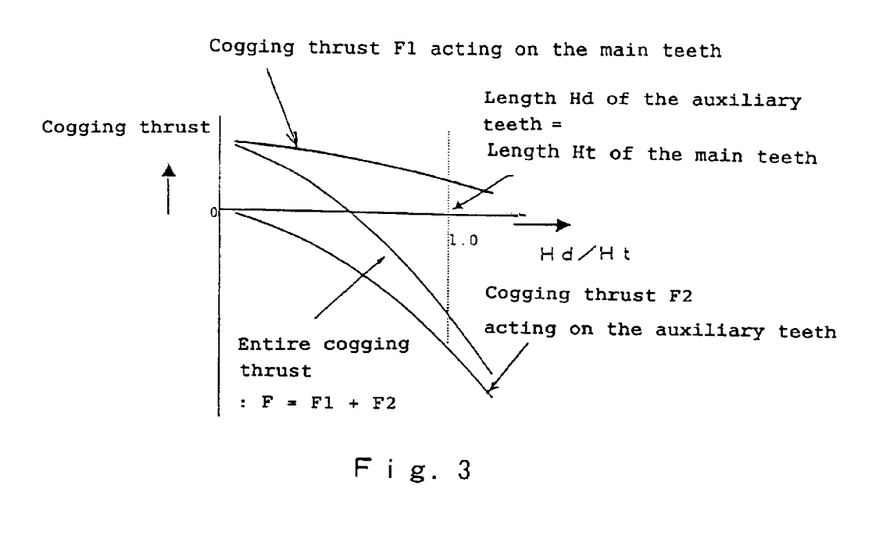
FIG. 3 schematically shows the relationship between the ratio of the length of the auxiliary teeth to the length of the main teeth of an armature and a cogging thrust.

FIG. 3 schematically shows the relationship between the ratio of the length of the auxiliary teeth 6 to the length of the main teeth 4b of an armature and a cogging thrust.

The horizontal axis represents the ratio of the length of the auxiliary teeth 6 to the length of the main teeth 4b of an armature, and the vertical axis represents a cogging thrust. As in FIG. 2, positive and negative signs are given to the cogging thrust in consideration of the direction of the cogging thrust in FIG. 3.

As can be understood from FIG. 3, the cogging thrust F2 acting on the auxiliary teeth 6 and the thrust F1 acting on the armature 3 change according to the length of the auxiliary teeth 6. The thrust acting on the main teeth 4b can be removed by appropriately setting the length of the auxiliary teeth 6, and the entire cogging thrust F (=F1+F2) can be reduced to zero.

The optimum value of the length of the auxiliary teeth 6 where a cogging thrust reaches zero depends on the distance between the centers of the auxiliary teeth 6, the field-pole pitch, the length of the armature core 4, the width of the auxiliary teeth 6, etc. Referring to the optimum value, if the ratio Hd/Ht of the length Hd of the auxiliary teeth to the length Ht of the main teeth is set to be 0.5≦Hd/Ht≦1 from an analytical result of FIG. 3, the cogging thrust can be reduced to almost zero. Additionally, if the width Bd of the auxiliary teeth 6 along the longitudinal direction of the array of the permanent magnets 2 is set to be narrower than the width Bt of the main teeth 4b along the longitudinal direction of the array of the permanent magnets under the aforementioned condition, it was verified that this width relationship is effective at further reducing the cogging thrust.

Therefore, in the linear motor, the relationship between the length Hd of the auxiliary teeth 6 and the length Ht of the main teeth 4b is appropriately set to be 0<Hd<Ht under the condition that the relationship between the center-to-center distance $\tau_p$ of the auxiliary teeth 6 and the pitch Tm of the field poles is expressed as $\tau_p=(2n-1)\times\tau_m/2$ (n is a positive integer), and therefore the cogging thrust can be made almost zero, and a high-performance permanent magnet synchronous linear motor that has a reduced cogging thrust can be provided.

Additionally, according to the aforementioned numerical analysis, it was understood that the following effect by which a cogging thrust is reduced exists, besides the aforementioned condition.

Second Embodiment

Next, a Second Embodiment will be described with reference to FIG. 1. Herein, the length of the auxiliary teeth 6 is set to be 0<Hd≦Ht where Hd is the length of the auxiliary teeth 6 in the direction orthogonal to the array of the permanent magnets 2 and Ht is the length of the main teeth 4b in the direction orthogonal to the array of the permanent magnets 2, under the condition that the relationship between the center-to-center distance $\tau_p$ of the auxiliary teeth 6 and the pitch $\tau_m$ of the field poles is set to be $\tau_p \neq (2n-1)\times\tau_m/2$ (n is a positive integer).

In this structure, the ratio Hd/Ht of the length Hd of the auxiliary teeth 6 to the length Ht of the main teeth 4b is set to be 0.5≦Hd/Ht≦1.

According to the Second Embodiment, when the relationship between the length Ht of the main teeth 4b and the length Hd of the auxiliary teeth 6 is set as mentioned above, the cogging thrust can be reduced to almost zero as in the First Embodiment, and a high-performance permanent magnet synchronous linear motor that has a reduced cogging thrust can be provided.

Third Embodiment

Next, a Third Embodiment will be described with reference to FIG. 1.

As described with regard to the conventional technique, the cogging waveform of the linear motor has high-order components including or exceeding the secondary component with respect to the pole pitch besides the primary component. Its amplitude becomes larger proportionately with a decrease in order. Therefore, for cogging reduction, the primary component and the secondary component are especially required to be reduced.

Next, a description will be given of an effect achieved by allowing the auxiliary teeth 6 to reduce the primary component or the secondary component. A description will be first given of the relationship between the center-to-center distance of the auxiliary teeth 6 and cogging.

What is needed to reduce the primary component is to, as disclosed in JP,7-053427,Y2, set the center-to-center distance of the auxiliary teeth 6 to be:

$$\tau_p=(2n-1)\cdot\tau_m/2$$

The center-to-center distance of the auxiliary teeth 6 by which the secondary component is removed is as follows.

$$FL=Fo\ \sin[(2x/\tau_m)2\pi]$$

$$FR=Fo\ \sin[(2x/\tau_m)2\pi+(2\tau_p/\tau_m)2\pi]$$

where FL is a force acting on the left auxiliary teeth 6, FR is a force acting on the right auxiliary teeth 6, Fo is the amplitude of the secondary component, and x is the position of the armature core 4.

Since the resultant force of FL and FR is required to be zero, $$Fs=Fo\ \sin[(2x/\tau_m)2\pi]+Fo\ \sin[(2x/\tau_m)2\pi+(2\tau_p/\tau_m)2\pi]=0$$

That is, what is needed is to satisfy:

$$(2\tau_p/\tau_m)2\pi=(2n-1)\pi/2$$

Therefore, $\tau_p=(2n-1)\tau_m/8$

Thus, the primary and secondary components can be simultaneously minimized by adjusting the length of the auxiliary teeth 6 though the center-to-center distance of the auxiliary teeth 6 by which the primary component is minimized is different from that of the auxiliary teeth 6 by which the secondary component is minimized.

The length of the auxiliary teeth 6 has a greater influence on the primary component, and the primary component can be reduced by appropriately setting the length of the auxiliary teeth 6 even when the center-to-center distance of the auxiliary teeth 6 is arbitrary. In this situation, the magnitude of the secondary component also changes according to the length of the auxiliary teeth 6. According to an analytical result brought about by the finite element method, it was ascertained that a position where the secondary component is simultaneously minimized exists in the range of $$(2n-1)\tau_m/8 \leq \tau_p (2n-1)\tau_m/2$$

In other words, what is needed to simultaneously reduce the primary and secondary components is to set the center-to-center distance of the auxiliary teeth 6 to be $(2n-1)\tau_m/8 \leq \tau_p (2n-1)\tau_m/2$. Accordingly, the optimum center-to-center distance of the auxiliary teeth 6 can be calculated by, for example, a numerical analysis or experiment according to the finite element method.

In the Third Embodiment, the primary and secondary components of a cogging waveform can be simultaneously reduced by setting the relationship between the field-pole pitch $\tau_m$ and the center-to-center distance $\tau_p$ of the auxiliary teeth as mentioned above, and therefore, as in the First and Second Embodiments, the cogging thrust can be reduced to almost zero, and a high-performance permanent magnet synchronous linear motor can be provided.

Fourth Embodiment

A Fourth Embodiment will be described.

The example of the armature core of an integral type has been shown in the First through Third Embodiments, but, instead of the integral armature core, one that is constructed of a plurality of divided cores may be provided. FIG. 4 is a side sectional view of a permanent magnet synchronous linear motor having divided cores.

In greater detail, an armature 3 of this linear motor is constructed such that an armature core 4 is divided into a plurality of core blocks, a convex engagement part 4d is then provided on one of the side faces of a yoke portion 4c that constitutes the divided core blocks whereas a concave engagement part 3e is provided on the other side face thereof, an armature winding 5 is then wound in the normal winding manner and is contained in a slot 4a of the core block, the engagement parts 4d and 4e of adjoining parts of the block cores are then fitted and united with each other, and, lastly, the united block cores are fixed to the undersurface of a movable element 7.

Since the length of the armature can be freely increased or decreased in accordance with the specifications of the linear motor in the Fourth Embodiment, design freedom can be increased, and a cogging thrust can be reduced by combining the Fourth Embodiment with the structural features of the First through Third Embodiments when a demand to lengthen the stroke of the linear motor is made.

Preferably, the relationship between the center-to-center distance $\tau_p$ of the auxiliary teeth shown in the embodiments and the center-to-center distance $\tau_{po}$ of the auxiliary teeth shown in the conventional techniques is set to be $\tau_p=\tau_{po}\times 0.99$.

Additionally, although the teeth have been formed to be open slots in the embodiments, semi-open slots are permissible as shown in, for example, FIG. 4, and a cogging thrust can be reduced by appropriately setting the auxiliary teeth.

Still additionally, although the linear motor has been described with reference to the gap-opposed type, it is permissible to dispose two-array field poles on both sides of the armature through a magnetic air gap so as to replace it with one of a magnetic-flux penetration type.

Still additionally, the material of the auxiliary teeth is allowed to differ from that of the armature part, and may be appropriately selected.

Still additionally, by appropriately setting the auxiliary teeth disposed at both ends of the armature core to assume an optimum shape, the present invention can have an effect by which the impedance unbalance between armature windings is restricted.

INDUSTRIAL APPLICABILITY

Thus, the permanent magnet synchronous linear motor of the present invention is useful for a carrier system of an FA apparatus, such as a table feeder of a construction machine or a stepper-driving mechanism of a semiconductor-manufacturing apparatus.

What is claimed is:

1. A permanent magnet synchronous linear motor comprising:

a field yoke having a plurality of permanent magnets which constitute field poles so that a polarity thereof is alternated and which are arranged linearly, and an armature facing an array of the permanent magnets through a magnetic air gap;

the armature comprising an armature core having main teeth and slots, an armature winding wound in the slot of the armature core, and auxiliary teeth provided at both ends of the armature core;

a center-to-center distance $\tau_p$ of the auxiliary teeth and a pitch $\tau_m$ of the field pole satisfying a relationship of $\tau_p = (2n-1) \times \tau_m / 2$ (n is a positive integer); and the field pole and the armature being relatively moved under the condition that one of the field pole and the armature is caused to serve as a stationary element and the other one is caused to serve as a movable element, wherein a length of the main teeth is constant and a length of the auxiliary teeth is set to be in the range of 0<Hd<Ht where Hd is the length of the auxiliary teeth in a direction orthogonal to the array of the permanent magnets and Ht is the length of the main teeth in the direction orthogonal to the array of the permanent magnets.

2. The permanent magnet synchronous linear motor of claim 1, characterized in that the width Bd of the auxiliary teeth along a longitudinal direction of the array of the permanent magnets is set to be narrower than the width Bt of the main teeth along the longitudinal direction of the array of the permanent magnets.

3. The permanent magnet synchronous linear motor of claim 1 or claim 2, characterized in that a ratio Hd/Ht of the length Hd of the auxiliary teeth to the length Ht of the main teeth is set to be 0.5≦Hd/Ht<1.

4. The permanent magnet synchronous linear motor of any one of claim 1 or claim 2, characterized in that the armature core is made up of a plurality of divided cores, and is formed such that a convex engagement part is provided on a side face of a yoke portion that constitutes the divided cores whereas a concave engagement part is provided on an opposite side face thereof, and adjoining parts of the engagement parts are fitted and united with each other.

5. A permanent magnet synchronous linear motor comprising:

a field yoke having a plurality of permanent magnets which constitute field poles so that a polarity thereof is alternated and which are arranged linearly, and an armature facing an array of the permanent magnets through a magnetic air gap;

the armature comprising an armature core having main teeth and slots, an armature winding wound in the slot of the armature core, and auxiliary teeth provided at both ends of the armature core;

a center-to-center distance p of the auxiliary teeth and a pitch $\tau_m$ of the field pole satisfying a relationship of $\tau_p \neq (2n-1) \times \tau_m / 2$ (n is a positive integer); and the field pole and the armature being relatively moved under the condition that one of the field pole and the armature is caused to serve as a stationary element and the other one is caused to serve as a movable element, wherein a length of the main teeth is constant and a length of the auxiliary teeth is set to be in the range of 0<Hd≦Ht where Hd is the length of the auxiliary teeth in a direction orthogonal to the array of the permanent magnets and Ht is the length of the main teeth in the direction orthogonal to the array of the permanent magnets.

6. The permanent magnet synchronous linear motor of claim 5, characterized in that a ratio Hd/Ht of the length lid of the auxiliary teeth to the length Ht of the main teeth is set to be 0.5<Hd/Ht<1.

7. The permanent magnet synchronous linear motor of claim 5 or claim 6, characterized in that the armature core is made up of a plurality of divided cores, and is formed such that a convex engagement part is provided on a side face of a yoke portion that constitutes the divided cores whereas a concave engagement part is provided on an opposite side face thereof, and adjoining parts of the engagement parts are fitted and united with each other.

8. A permanent magnet synchronous linear motor comprising:

a field yoke having a plurality of permanent magnets which constitute field poles so that a polarity thereof is alternated and which are arranged linearly, and an armature facing an array of the permanent magnets through a magnetic air gap;

the armature comprising an armature core having main teeth and slots, an armature winding wound in the slot of the armature core, and auxiliary teeth provided at both ends of the armature core; and the field pole and the armature being relatively moved under the condition that one of the field pole and the armature is caused to serve as a stationary element and the other one is caused to serve as a movable element, wherein a center-to-center distance $\tau_p$ of the auxiliary teeth and a pitch $\tau_m$ of the field pole satisfying a relationship of $(2n-1)\tau_m/8 \leq \tau_p \leq (2n-1)\tau_m/2$ (n is a positive integer), and wherein a length of the main teeth is constant and a length of the auxiliary teeth is set to be in the range of 0<Hd≦Ht where Hd is the length of the auxiliary teeth in a direction orthogonal to the array of the permanent magnets and Ht is the length of the main teeth in the direction orthogonal to the array of the permanent magnets.

9. The permanent magnet synchronous linear motor of claim 8, characterized in that the width Bd of the auxiliary teeth along a longitudinal direction of the array of the permanent magnets is set to be narrower than the width Bt of the main teeth along the longitudinal direction of the array of the permanent magnets.

10. The permanent magnet synchronous linear motor of claim 8 or claim 9, characterized in that the armature core is made up of a plurality of divided cores, and is formed such that a convex engagement part is provided on a side face of a yoke portion that constitutes the divided cores whereas a concave engagement part is provided on an opposite side face thereof, and adjoining parts of the engagement parts are fitted and united with each other.

* * * * *